United States Patent
Chen et al.

(10) Patent No.: US 9,087,534 B1
(45) Date of Patent: Jul. 21, 2015

(54) METHOD AND SYSTEM FOR PROVIDING A READ TRANSDUCER HAVING SOFT AND HARD MAGNETIC BIAS STRUCTURES

(71) Applicant: Western Digital (Fremont), LLC, Fremont, CA (US)

(72) Inventors: Laurence L. Chen, Hayward, CA (US); Anup G. Roy, Fremont, CA (US); Yunfei Ding, Fremont, CA (US); Ming Mao, Dublin, CA (US); Amritpal S. Rana, Union City, CA (US); Daniele Mauri, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/290,932

(22) Filed: May 29, 2014

Related U.S. Application Data

(62) Division of application No. 13/332,313, filed on Dec. 20, 2011, now Pat. No. 8,760,823.

(51) Int. Cl.
*G11B 5/39* (2006.01)

(52) U.S. Cl.
CPC ............ *G11B 5/3903* (2013.01); *G11B 5/3932* (2013.01); *G11B 5/3912* (2013.01)

(58) Field of Classification Search
CPC .. G11B 5/3912; G11B 5/3932; G11B 5/3163; G11B 5/3903; G11B 5/3906; G11B 5/11; G11B 5/3929; G11B 5/112; G11B 5/313; G11B 5/398
USPC ............................................. 360/324.12, 319
See application file for complete search history.

(56) References Cited

U.S. PATENT DOCUMENTS

| | | | |
|---|---|---|---|
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |

(Continued)

OTHER PUBLICATIONS

Notice of Allowance dated Feb. 12, 2014 from U.S. Appl. No. 13/332,313, 5 pages.
Office Action dated Oct. 24, 2013 from U.S. Appl. No. 13/332,313, 8 pages.
Advisory Action dated Sep. 26, 2013 from U.S. Appl. No. 13/332,313, 3 pages.

(Continued)

*Primary Examiner* — Will J Klimowicz

(57) ABSTRACT

A method and system provide a magnetic transducer having an air-bearing surface (ABS). The magnetic transducer includes a first shield, a read sensor, at least one soft magnetic bias structure and at least one hard bias structure. The read sensor includes a sensor layer that has at least one edge in the track width direction along the ABS. The soft magnetic bias structure(s) are adjacent to the edge(s) of the sensor layer. The soft magnetic bias structure has a first permeability. The soft bias structure(s) are between the read sensor and the hard bias structure(s). The hard bias structure(s) are adjacent to a portion of the soft bias structure(s) and have a second permeability. The first permeability is at least ten multiplied by the second permeability.

20 Claims, 5 Drawing Sheets

(56) References Cited

U.S. PATENT DOCUMENTS

| | | |
|---|---|---|
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |

(56) References Cited

U.S. PATENT DOCUMENTS

| | | |
|---|---|---|
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,944,939 B2 | 9/2005 | Guo et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,130,165 B2 | 10/2006 | Macken et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,229,706 B2 | 6/2007 | Hasegawa et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,301,734 B2 | 11/2007 | Guo et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,468,870 B2 | 12/2008 | Arasawa et al. |
| 7,493,688 B1 | 2/2009 | Wang et al. |

(56) References Cited

U.S. PATENT DOCUMENTS

| | | |
|---|---|---|
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,580,230 B2 | 8/2009 | Freitag et al. |
| 7,583,466 B2 | 9/2009 | Kermiche et al. |
| 7,595,967 B1 | 9/2009 | Moon et al. |
| 7,599,151 B2 * | 10/2009 | Hatatani et al. .............. 360/319 |
| 7,599,158 B2 | 10/2009 | Wang et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,675,718 B2 | 3/2010 | Chang et al. |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,804,668 B2 | 9/2010 | Zhou et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,848,065 B2 | 12/2010 | Freitag et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,898,776 B2 | 3/2011 | Nakabayashi et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,011,084 B2 | 9/2011 | Le et al. |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |

(56) References Cited

U.S. PATENT DOCUMENTS

| | | |
|---|---|---|
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,526 B2 * | 4/2014 | Colak et al. .................. 360/319 |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 * | 6/2014 | Chen et al. ............... 360/324.12 |
| 8,763,235 B1 | 7/2014 | Wang et al. |
| 8,780,498 B1 | 7/2014 | Jiang et al. |
| 8,780,505 B1 | 7/2014 | Xiao |
| 8,780,506 B1 * | 7/2014 | Maat et al. .................... 360/319 |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2005/0157431 A1 * | 7/2005 | Hatatani et al. ............... 360/319 |
| 2009/0180217 A1 | 7/2009 | Chou et al. |
| 2010/0290157 A1 | 11/2010 | Zhang et al. |
| 2011/0086240 A1 | 4/2011 | Xiang et al. |
| 2011/0215800 A1 | 9/2011 | Zhou et al. |
| 2011/0273802 A1 | 11/2011 | Zhou et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0275062 A1 | 11/2012 | Gao |
| 2012/0281320 A1 | 11/2012 | Singleton et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

Final Office Action dated Jul. 26, 2013 from U.S. Appl. No. 13/332,313, 8 pages.

Office Action dated Mar. 12, 2013 from U.S. Appl. No. 13/332,313, 14 pages.

\* cited by examiner

METHOD AND SYSTEM FOR PROVIDING A READ TRANSDUCER HAVING SOFT AND HARD MAGNETIC BIAS STRUCTURES

CROSS REFERENCE TO RELATED APPLICATION(S)

This application is a divisional of co-pending application Ser. No. 13/332,313 filed on Dec. 20, 2011, which is hereby incorporated by reference.

BACKGROUND

FIG. 1 depicts an air-bearing surface (ABS) view of a conventional read transducer used in magnetic recording technology applications. The conventional read transducer 10 includes shields 12 and 18, insulator 14, hard bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. Consequently, as used herein a sensor layer 28 is typically a free layer.

If the sensor 20 is to be used in a current perpendicular to plane (CPP) configuration, the insulator 14 is used. Thus, current is driven in a direction substantially perpendicular to the plane of the layers 22, 24, 26, and 28. Conversely, in a current parallel to plane (CIP) configuration, then conductive leads (not shown) would be provided on the hard bias structures 16.

The hard bias structures 16 are used to magnetically bias the sensor layer 28. In an ideal case, the hard bias structures 16 match the thickness, moment, and location of the sensor layer 28. The hard bias structures 16 typically include hard magnetic materials having a low permeability. The hard bias structures generally have a magnetization fixed in the working ranges of the transducer. The hard bias structures 16 typically magnetically bias the magnetization of the sensor layer 28 in the track width direction.

Although the conventional transducer 10 functions, there are drawbacks. The conventional transducer 10 has a shield-to-shield spacing of SS and a physical width of the sensor layer 28 of w. In general, the shield-to-shield spacing is desired to be reduced as higher density memories are to be read. Similarly, the track width is generally decreased as reading of higher density memories and thus higher cross-track resolution are desired. The cross-track resolution of the sensor layer 28 is primarily determined by the physical width, w, of the sensor layer 28. However, magnetic flux entering from the sides of the sensor layer 28 can adversely impact cross-track resolution. Stated differently, magnetic flux entering from the sides of the sensor layer 28 may influence the ability of the sensor layer 28 to accurately read data. The shields 12 and 18 may prevent some flux from reaching the sides of the sensor layer 28. However, as technologies scale to higher recording densities, the shield-to-shield spacing does not decrease sufficiently to address this issue. In addition, other recording mechanisms, such as shingle recording, may require improved cross-track resolution.

A conventional method for improving the cross-track resolution of the conventional transducer 10 is to introduce an in-stack hard bias layer in connection with side shields. An in-stack hard bias layer is one which resides between (on a line parallel to the down track direction) the sensor layer 28 and the shield 12 or directly between the sensor layer 28 and the shield 18. Generally, the in-stack hard bias would reside directly above (in the down track direction/toward shield 18) the sensor layer 28. The in-stack hard bias layer is desired to maintain the magnetic biasing of the sensor layer 28 in the track direction. Thus, the in-stack hard bias layer may replace the hard bias structures 16. However, such an in-stack hard bias layer would increase the shield-to-shield spacing, SS, of the transducer 10. Such an increase is undesirable.

Accordingly, what is needed is a system and method for improving the cross-track resolution of a magnetic recording read transducer.

BRIEF SUMMARY OF THE INVENTION

A method and system provide a magnetic transducer having an air-bearing surface (ABS). The magnetic transducer includes a first shield, a read sensor, at least one soft magnetic bias structure and at least one hard bias structure. The read sensor includes a sensor layer that has at least one edge in the track width direction along the ABS. The soft magnetic bias structure(s) are adjacent to the edge(s) of the sensor layer. The soft magnetic bias structure has a first permeability. The soft bias structure(s) are between the read sensor and the hard bias structure(s). The hard bias structure(s) are adjacent to a portion of the soft bias structure(s) and have a second permeability. The first permeability is at least ten multiplied by the second permeability.

DETAILED DESCRIPTION OF THE PREFERRED EMBODIMENTS

Figure 1:
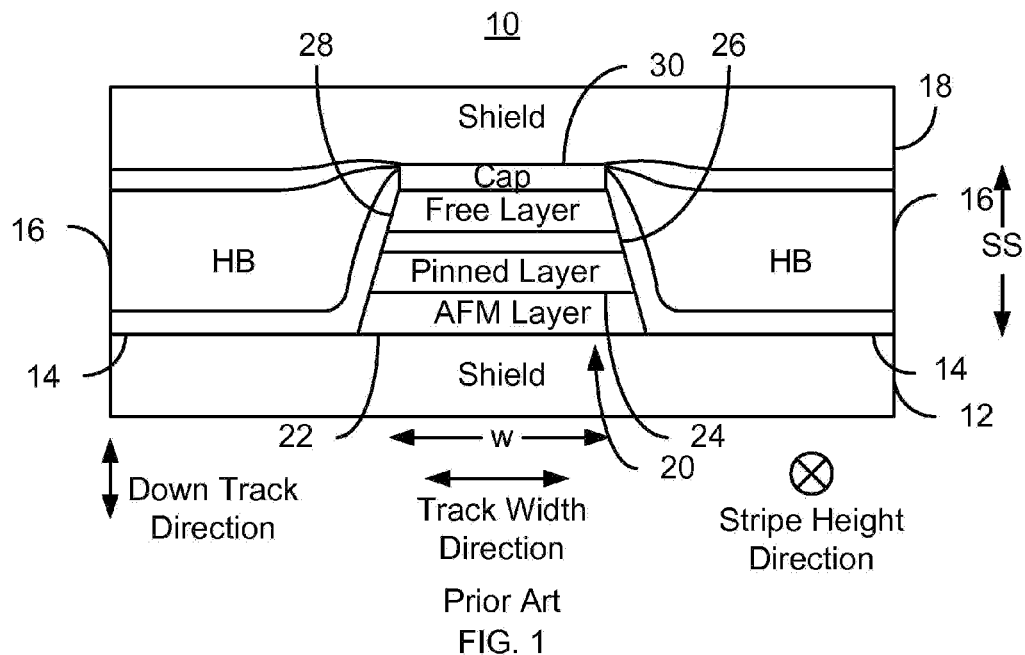
FIG. 1 depicts an ABS view of a conventional magnetic recording read transducer.
Figure 2:
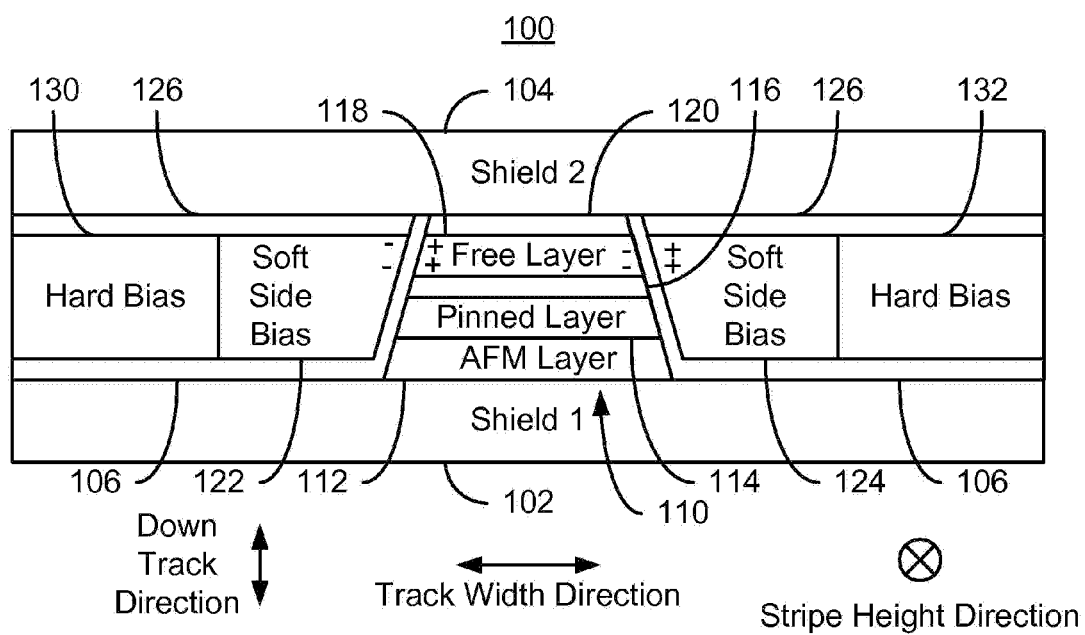
FIG. 2 depicts an ABS view of an exemplary embodiment of a portion of a magnetic recording read transducer.

FIG. 2 depicts an ABS view of an exemplary embodiment of a portion of a magnetic read transducer 100. For clarity, FIG. 2 is not to scale. The read transducer 100 may be part of a read head or may be part of a merged head that also includes a write transducer. The head of which the read transducer 100 is a part is part of a disk drive having a media, a slider and the head coupled with the slider. The read transducer 100 is also described in the context of particular components. In other embodiments, some of the components may be omitted, provided in a different location, or have different constituents. Further, other components may be used.

The transducer 100 includes shields 102 and 104, insulator 106, a read sensor 110, soft magnetic bias structures 122 and 124, and hard bias structures 130 and 132. The sensor 110 shown is a GMR or TMR sensor. Thus, the sensor 110 includes a pinning layer 112, a pinned layer 114, a nonmagnetic spacer layer 116, a free layer 118, and a capping layer 120. The sensor 110 may also include seed layer(s) (not shown). Although an AFM layer 112 used to pin the magnetic moment of the pinned layer 116 is shown, in other embodiments, the pinning layer may be omitted or may use a different pinning mechanism. The pinned layer 114 and free layer 118 are each shown as a single layer, but may include multiple layers including but not limited to a synthetic antiferromagnetic (SAF) structure. The nonmagnetic spacer layer 116 may be a conductive layer, a tunneling barrier layer, or other analogous layer. Although depicted as a GMR or TMR sensor, in other embodiments, other structures and other sensing mechanisms may be used for the sensor 110.

Figure 10:
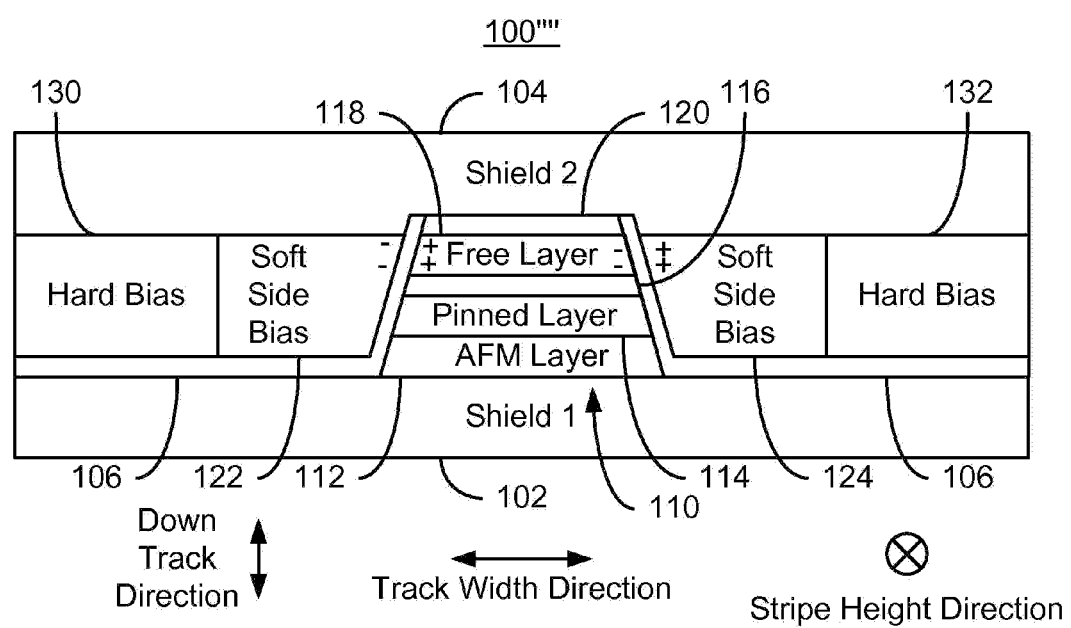
FIG. 10 depicts an ABS view of another exemplary embodiment of a portion of a magnetic recording read transducer.

The soft magnetic bias structures 122 and 124 are separated from the sensor 110 by insulating layer 106. Thus, the soft magnetic bias structures 122 and 124 are adjacent to the sides of the sensor 110. In the embodiment shown in FIG. 2, the soft magnetic bias structures 122 and 124 are also shown as separated from the shields 102 and 104 by nonmagnetic layers 106 and 126, respectively. Thus, the soft magnetic bias structures 122 and 124 are magnetically decoupled from the shields 102 and 104. However, in alternate embodiments, the soft magnetic bias structures 122 and/or 124 may be connected the shield 104 for example by omitting the layer 126. One such embodiment is depicted as transducer 100"" in FIG. 10. The transducer 100"" is analogous to the transducer 100, but the nonmagnetic layer 126 has been omitted.

The soft magnetic bias structures 122 and 124 are made using soft magnetic material(s). Thus, the soft magnetic bias structures 122 and/or 124 include magnetic material(s) that have a permeability of at least ten multiplied by the permeability of hard bias structures 130 and 132. For example, the soft magnetic bias structures 122 and/or 124 may include NiFe, such as Permalloy. Because the soft magnetic bias structures 122 and/or 124 have a high permeability, the soft magnetic side shield 102 and/or 104 magnetically biases the sensor 110. As can be seen in FIG. 2, the magnetic moment of the free layer 118 results in positive magnetic charges (+) on one side of the free layer 118 and negative magnetic charges (−) on the opposite side. Because the soft magnetic bias structures 122 and 124 have a high permeability, negative magnetic charges (−) are formed on the side of the soft magnetic bias structure 122 closest to the positive magnetic charges in the free layer 118. Similarly, positive magnetic charges (+) are formed on the side of the soft magnetic bias structures 124 closest to the negative magnetic charges in the free layer 118. Thus, the soft magnetic bias structures 122 and 124 may mirror the magnetic charges of the free layer 118. If the magnetization of the free layer 118 is in the opposite direction to that shown in FIG. 2, the soft magnetic bias structures 122 and 124 would be oppositely charged to mirror this magnetization. As a result, the soft magnetic bias structures 122 and 124 may magnetically bias the free layer 118. In addition, because of their high permeability, the soft magnetic side bias structures 122 and 124 may shield the free layer 118 from stray fields entering through the edges. Thus, the soft magnetic bias structures 122 and/or 124 may also act as side shields for the sensor 110.

In some embodiments, the soft magnetic bias structures 122 and/or 124 are composed of a single high full film permeability material, such as Permalloy. In other embodiments, the soft magnetic bias structures 122 and/or 124 include multiple materials, which may not all have a high permeability. For example, the magnetic bias structures 122 and/or 124 may be a multilayer. For example, the multilayer may include a first magnetic layer, a second magnetic layer, and a nonmagnetic layer between the first magnetic layer and the second magnetic layer. In some embodiments, the first and second magnetic layers may be antiferromagnetically aligned. In other embodiments, the first and second magnetic layer may be ferromagnetically aligned. Further, more than two ferromagnetic layers interleaved with nonmagnetic layers may be used. In other embodiments, all of the layers in the multilayer may be ferromagnetic.

In addition, the read transducer 100 includes hard bias structures 130 and 132. In the embodiment shown, the hard bias structures 130 and 132 share an interface with the soft magnetic bias structures 122 and 124, respectively. Thus, the hard bias structures 130 and 132 adjoin the soft magnetic bias structures 122 and 124, respectively. However, in other embodiments, a nonmagnetic layer may be provided between the hard bias structures 132 and 134 and the soft magnetic bias structures 122 and 124, respectively. Further, nonmagnetic layers 106 and 126 are depicted as being between the hard bias structures 130 and 132 and the shields 102 and 104, respectively. Thus, the hard bias structures 130 and 132 may be magnetically decoupled from the shields 102 and 104. However, in other embodiments, the portions of the layer 126 between the hard bias structures 130 and 132 and the shield 104 may be omitted. Thus, the hard bias structures 130 and/or 132 may be magnetically coupled with the shield 104.

Hard bias structures 130 and 132 are used to stabilize the soft magnetic bias structures 122 and 124, rather than to directly bias the free layer 118. Without hard bias structures 130 and/or 132, the soft magnetic bias structures 122 and/or 124, respectively, may be subject to reversals during fabrication or use, which is undesirable. The hard bias structure 130 and 132 are used to magnetically bias the soft bias structures 122 and 124, respectively. Stated differently, the hard bias structures 130 and/or 132 may be seen as pinning the soft bias structures 122 and/or 124, respectively.

The hard bias structures 130 and/or 132 have a permeability that is significantly lower than the soft bias structures 122 and/or 124. The hard bias structures 130 and 132 also generally have a significantly higher anisotropy field than the soft bias structures 122 and 124. For example, the anisotropy field of the hard bias structures may be on the order of a few thousand Oe in some embodiments. The coercivity of the hard bias structures 130 and 132 is also generally significantly higher than that of the soft bias structures 122 and 124. For example, in some embodiments, the coercivity of the hard bias structures 132 and 134 may be on the order of hundreds or thousands of Oe. Thus, the hard bias structures 130 and 132 are generally not susceptible to reversals during fabrication or operation. For example, may include CoPt, CoCrPt and/or FePt. Although shown as a single layer, the hard bias structures 130 and/or 132 may include multiple layers. In some embodiments, all of the layers in the multilayer are ferromagnetic. However, in other embodiments, some of the layers may be ferromagnetic, while other layers are nonmagnetic.

The transducer 100 thus enjoys the benefits of soft bias structures 122 and 124. In particular, the sensor 110 may be magnetically biased and enjoy the benefits of side shields such as reduced interference from adjacent tracks. Because of the presence of hard bias structures 130 and 132, the soft bias structures 122 and 124 may have improved magnetic uniformity and a significantly reduced chance of reversal. Thus, the reliability and performance of the transducer 100 may be improved. The magnetization direction of the hard bias structures 130 and 132 may be set by applying a magnetic field and without additional annealing. Thus, damage to the sensor 110 may be avoided. The hard bias structures 130 and/or 132 may also optionally be used to bias the shield 102 and/or 104. Thus, performance of the transducer 100 may be further improved. Fabrication of hard bias structures 130 and 132 may also be relatively simple. Thus, the benefits of the hard bias structures 130 and 132 may be attained without significantly complicating processing.

Figure 3:
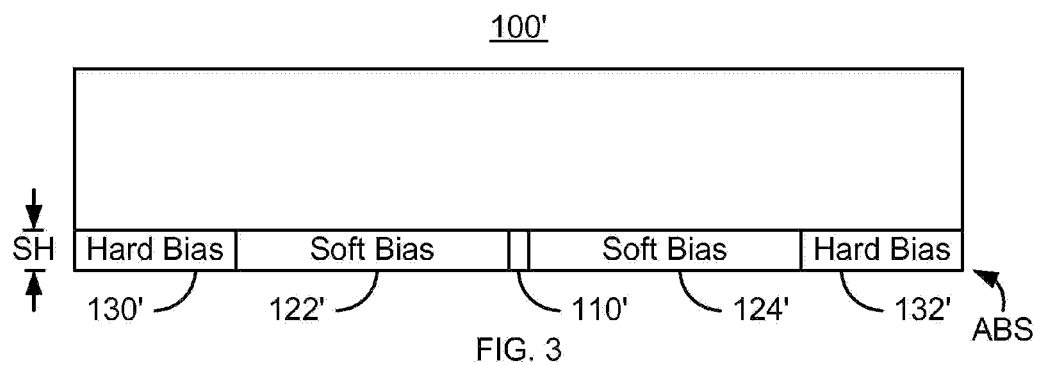
FIG. 3 is a plan view of an exemplary embodiment of a portion of a magnetic recording read transducer.

FIG. 3 depicts a plan view of another embodiment of a magnetic transducer 100'. For clarity, FIG. 3 is not to scale and some components are omitted. The read transducer 100' may be part of a read head or may be part of a merged head that also includes a write transducer. The head of which the read transducer 100' is a part is part of a disk drive having a media, a slider and the head coupled with the slider. The magnetic read transducer 100' may be viewed as an application of the magnetic transducer 100. Similar components have analogous labels. The magnetic transducer 100' includes sensor 110', soft magnetic bias structures 122' and 124', and hard magnetic bias structures 130' and 132' that correspond to the sensor 110, soft magnetic bias structures 122 and 124, and hard magnetic bias structures 130 and 132, respectively. Thus, the components 110', 122', 124', 130', and 132' have a similar structure and function to the components 110, 122, 124, 130, 132, respectively.

As can be seen in the plan view of FIG. 3, the sensor 110' extends a stripe height, SH, in the stripe height direction perpendicular to the ABS. In the embodiment shown in FIG. 3, the soft bias structures 122' and 124' extend the same distance in the stripe height direction as the sensor 110'. Similarly, the hard bias structures 130' and 132' extend the same distance in the stripe height direction as the soft bias structures 122' and 124' as well as the sensor 110'.

The transducer 100' may share the benefits of the transducer 100. The sensor 110' may be magnetically biased and enjoy the benefits of side shields such as reduced interference from adjacent tracks. The hard bias structures 130' and 132' may improve the magnetic uniformity of and reduce the chance of reversal for the soft bias structures 122' and 124'. Thus, the reliability and performance of the transducer 100' may be improved. The magnetization direction of the hard bias structures 130' and 132' may be set by applying a magnetic field and without additional annealing. Thus, damage to the sensor 110' may be avoided. The hard bias structures 130' and/or 132' may also optionally be used to bias the shield(s) (not shown). Thus, performance of the transducer 100' may be further improved. Fabrication of hard bias structures 130' and 132' may also be relatively simple. Thus, the benefits of the hard bias structures 130' and 132' may be attained without significantly complicating processing.

Figure 4:
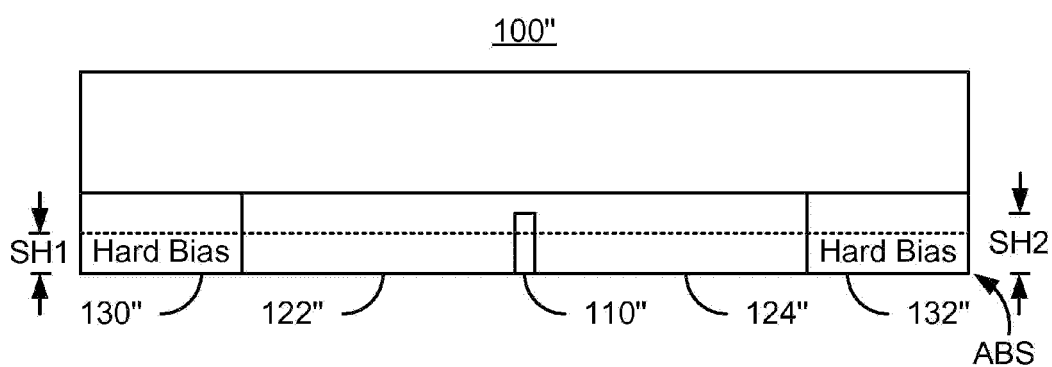
FIG. 4 is a plan view of another exemplary embodiment of a portion of a magnetic recording read transducer.

FIG. 4 depicts a plan view of another embodiment of a magnetic transducer 100". For clarity, FIG. 4 is not to scale and some components are omitted. The read transducer 100" may be part of a read head or may be part of a merged head that also includes a write transducer. The head of which the read transducer 100" is a part is part of a disk drive having a media, a slider and the head coupled with the slider. The magnetic read transducer 100" may be viewed as an application of the magnetic transducer 100. Similar components have analogous labels. The magnetic transducer 100" includes sensor 110", soft magnetic bias structures 122" and 124", and hard magnetic bias structures 130" and 132" that correspond to the sensor 110, soft magnetic bias structures 122 and 124, and hard magnetic bias structures 130 and 132, respectively. Thus, the components 110''', 122''', 124''', 130''', and 132''' have a similar structure and function to the components 110, 122, 124, 130, 132, respectively.

As can be seen in the plan view of FIG. 4, the sensor 110" has two stripe heights SH1 and SH2. The stripe height SH1 may be for the entire sensor including the free layer. The stripe height SH2 may correspond to an extended pinned layer. Such an extended pinned layer extends further in the stripe height direction than the free layer. In the embodiment shown in FIG. 4, the soft magnetic bias structures 122" and 124" extend further in the stripe height direction than any portion of the sensor 110". In other embodiments, the soft bias magnetic structures 122" and/or 124" may extend only to the stripe height SH2. In some embodiments, the thickness of the soft magnetic bias structures 122" and 124" decreases further from the ABS than SH1. Thus, the soft magnetic bias structures 122" and 124" may be thinner in the region of the extended pinned layer. In still other embodiments, the soft magnetic bias structures 122" and/or 124" may extend only to the stripe height SH1. Similarly, the hard bias structures 130" and 132" extend further in the stripe height direction than any portion of the sensor 110". In other embodiments, the hard bias structures 130" and/or 132" may extend only to the stripe height SH2. In still other embodiments, the hard bias structures 130" and/or 132" may extend only to the stripe height SH1. In some embodiments, the thickness of the hard bias structures 130" and/or 132" decreases further from the ABS than SH1. Thus, the hard bias structures 130" and/or 132" may be thinner in the region of the extended pinned layer.

The transducer 100" may share the benefits of the transducer 100. The sensor 110" may be magnetically biased and enjoy the benefits of side shields such as reduced interference from adjacent tracks. The hard bias structures 130" and 132" may improve the magnetic uniformity of and reduce the chance of reversal for the soft bias structures 122" and 124". Thus, the reliability and performance of the transducer 100" may be improved. The magnetization direction of the hard bias structures 130" and 132" may be set by applying a magnetic field and without additional annealing. Thus, damage to the sensor 110" may be avoided. The hard bias structures 130" and/or 132" may also optionally be used to bias the shield(s) (not shown). Thus, performance of the transducer 100" may be further improved. Fabrication of hard bias structures 130" and 132" may also be relatively simple. Thus, the benefits of the hard bias structures 130" and 132" may be attained without significantly complicating processing.

Figure 5:
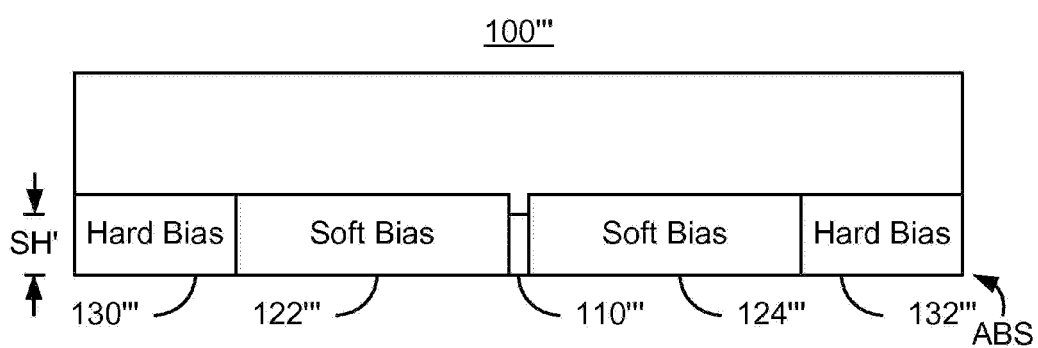
FIG. 5 is a plan view of another exemplary embodiment of a portion of a magnetic recording read transducer.

FIG. 5 depicts a plan view of another embodiment of a magnetic transducer 100'''. For clarity, FIG. 5 is not to scale and some components are omitted. The read transducer 100''' may be part of a read head or may be part of a merged head that also includes a write transducer. The head of which the read transducer 100''' is a part is part of a disk drive having a media, a slider and the head coupled with the slider. The magnetic read transducer 100''' may be viewed as an application of the magnetic transducer 100. Similar components have analogous labels. The magnetic transducer 100''' includes sensor 110''', soft magnetic bias structures 122''' and 124''', and hard magnetic bias structures 130''' and 132''' that correspond to the sensor 110, soft magnetic bias structures 122 and 124, and hard magnetic bias structures 130 and 132, respectively. Thus, the components 110", 122", 124", 130", and 132" have a similar structure and function to the components 110, 122, 124, 130, 132, respectively.

As can be seen in the plan view of FIG. 5, the sensor 110''' has a stripe height SH'. The soft magnetic bias structures 122''' and 124''' extend a different distance from the ABS than the sensor 110'''. In the embodiment shown in FIG. 5, the soft magnetic bias structures 122''' and 124''' extend further in the stripe height direction than the sensor 110". In other embodiments, the soft bias magnetic structures 122''' and/or 124''' may not extend as far from the ABS as the sensor 110'''. Similarly, the hard bias structures 130''' and 132''' extend a different distance from the ABS than the sensor 110'''. In the embodiment shown, the hard bias structures 130''' and 132''' extend further in the stripe height direction than the sensor 110'''. In other embodiments, the hard bias structures 130''' and/or 132''' may not extend as far in the stripe height direction as the sensor 110'''. Further, the hard bias structures 130''' and/or 132''' may extend a different distance in the stripe height direction than the soft magnetic bias structures 122''' and 124'''.

The transducer 100''' may share the benefits of the transducer 100. The sensor 110''' may be magnetically biased and enjoy the benefits of side shields such as reduced interference from adjacent tracks. The hard bias structures 130''' and 132''' may improve the magnetic uniformity of and reduce the chance of reversal for the soft bias structures 122''' and 124'''. Thus, the reliability and performance of the transducer 100''' may be improved. The magnetization direction of the hard bias structures 130''' and 132''' may be set by applying a magnetic field and without additional annealing. Thus, damage to the sensor 110''' may be avoided. The hard bias structures 130''' and/or 132''' may also optionally be used to bias the shield(s) (not shown). Thus, performance of the transducer 100''' may be further improved. Fabrication of hard bias structures 130''' and 132''' may also be relatively simple. Thus, the benefits of the hard bias structures 130''' and 132''' may be attained without significantly complicating processing.

Figure 6:
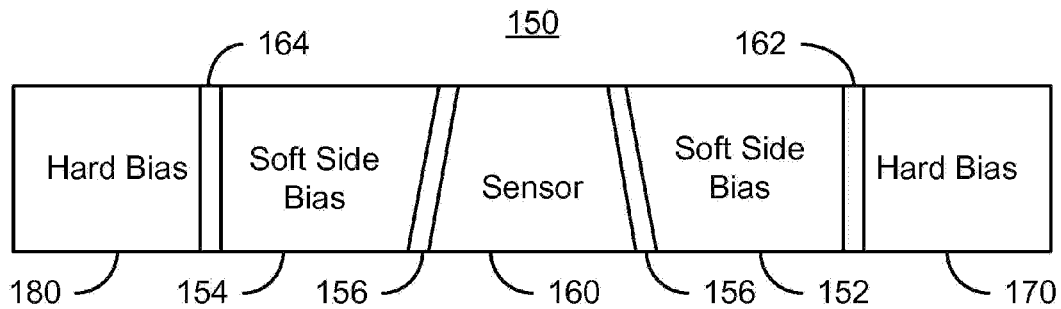
FIG. 6 is an ABS view of another exemplary embodiment of a portion of a magnetic recording read transducer.

FIG. 6 depicts an ABS view of another embodiment of a magnetic transducer 150. For clarity, FIG. 6 is not to scale and some components are omitted. The read transducer 150 may be part of a read head or may be part of a merged head that also includes a write transducer. The head of which the read transducer 150 is a part is part of a disk drive having a media, a slider and the head coupled with the slider. The magnetic read transducer 150 may be viewed as an application of the magnetic transducer 100, 100', 100", or 100'''. Similar components have analogous labels. The magnetic transducer 150 includes sensor 160, insulating layers 156, soft magnetic bias structures 152 and 154, and hard magnetic bias structures 170 and 180 that correspond to the sensor 110/110'/110"/110''', insulator 106, soft magnetic bias structures 122/122'/122"/122''' and 124/124'/124"/124''', and hard magnetic bias structures 130/130'/130"/130''' and 132/132'/132"/132''', respectively. Thus, the components 160, 156, 152, 154, 170, and 180 have a similar structure and function to the components 110/110'/110"/110''', 106, 122/122'/122"/122''', 124/124'/124"/124''', 130/130'/130"/130''', and 132/132'/132"/132''', respectively.

In the embodiment shown in FIG. 6, the hard bias structures 170 and 180 do not adjoin the soft magnetic bias structures 152 and 154, respectively. Instead, the hard bias structures 170 and 180 are separated from the soft magnetic bias structures 152 and 154 by a nonmagnetic layer 162 and 164, respectively. Such a layer 162 or 164 may be used to simplify fabrication of the hard bias structures 170 and 180.

The transducer 150 may share the benefits of the transducer 100, 100', 100", and/or 100'''. The sensor 160 may be magnetically biased and enjoy the benefits of side shields such as reduced interference from adjacent tracks. The hard bias structures 170 and 180 may improve the magnetic uniformity of and reduce the chance of reversal for the soft bias structures 152 and 154. Thus, the reliability and performance of the transducer 150 may be improved. The magnetization direction of the hard bias structures 170 and 180 may be set by applying a magnetic field and without additional annealing. Thus, damage to the sensor 160 may be avoided. The hard bias structures 170 and/or 180 may also optionally be used to bias the shield(s) (not shown). Thus, performance of the transducer 150 may be further improved. Fabrication of hard bias structures 170 and 180 may also be relatively simple and may be further eased by use of the nonmagnetic layers 162 and 164. Thus, the benefits of the hard bias structures 170 and 180 may be attained without significantly complicating processing.

Figure 7:
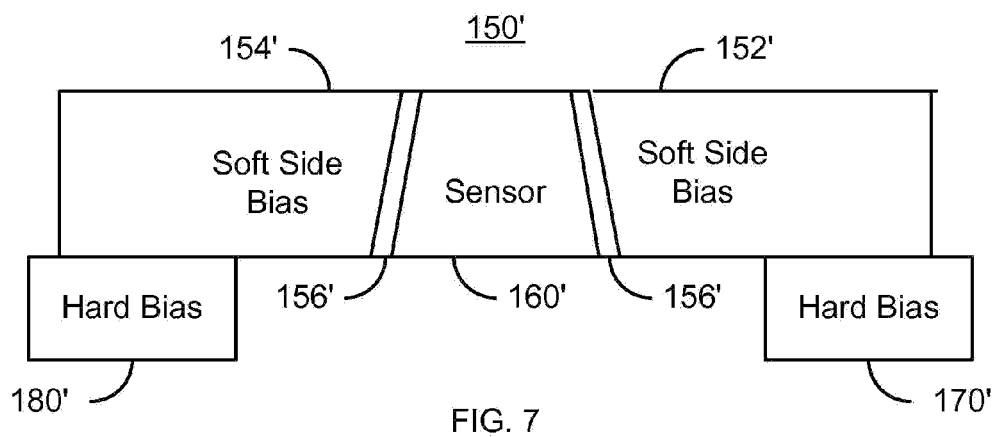
FIG. 7 is an ABS view of another exemplary embodiment of a portion of a magnetic recording read transducer.

FIG. 7 depicts an ABS view of another embodiment of a magnetic transducer 150'. For clarity, FIG. 7 is not to scale and some components are omitted. The read transducer 150' may be part of a read head or may be part of a merged head that also includes a write transducer. The head of which the read transducer 150' is a part is part of a disk drive having a media, a slider and the head coupled with the slider. The magnetic read transducer 150' may be viewed as an application of the magnetic transducer 100, 100', 100", 100''', or 150. Similar components have analogous labels. The magnetic transducer 150' includes sensor 160', insulator 156', soft magnetic bias structures 152' and 154', and hard bias structures 170' and 180' that correspond to the sensor 160/110/110'/110"/110''', insulator 156/106, soft magnetic bias structures 152/122/122'/122"/122''' and 154/124/124'/124"/124''', and hard magnetic bias structures 170/130/130'/130"/130''' and 180/132/132'/132"/132''', respectively. Thus, the components 160', 156', 152', 154', 170', and 180' have a similar structure and function to the components 160/110/110'/110"/110''', 156/106, 152/122/122'/122"/122''', 154/124/124'/124"/124''', 170/130/130'/130"/130''', and 180/132/132'/132"/132''', respectively. Although not shown, in some embodiments, a nonmagnetic layer may reside between the soft magnetic bias structures 152' and 154' and hard bias structures 170' and 180', respectively. However, in the embodiment shown in FIG. 7, the hard bias structures 170' and 180' reside below the soft magnetic bias structures 152' and 154', respectively. In other embodiments, the hard bias structures 170' and 180' may reside on top of the soft magnetic bias structures 152' and 154', respectively.

The transducer 150' may share the benefits of the transducers 150, 100, 100', 100", and/or 100'''. The sensor 160' may be magnetically biased and enjoy the benefits of side shields such as reduced interference from adjacent tracks. The hard bias structures 170' and 180' may improve the magnetic uniformity of and reduce the chance of reversal for the soft bias structures 152' and 154'. Thus, the reliability and performance of the transducer 150' may be improved. The magnetization direction of the hard bias structures 170' and 180' may be set by applying a magnetic field and without additional annealing. Thus, damage to the sensor 160' may be avoided. The hard bias structures 170' and/or 180' may also optionally be used to bias the shield(s) (not shown). Thus, performance of the transducer 150' may be further improved.

Figure 8A:
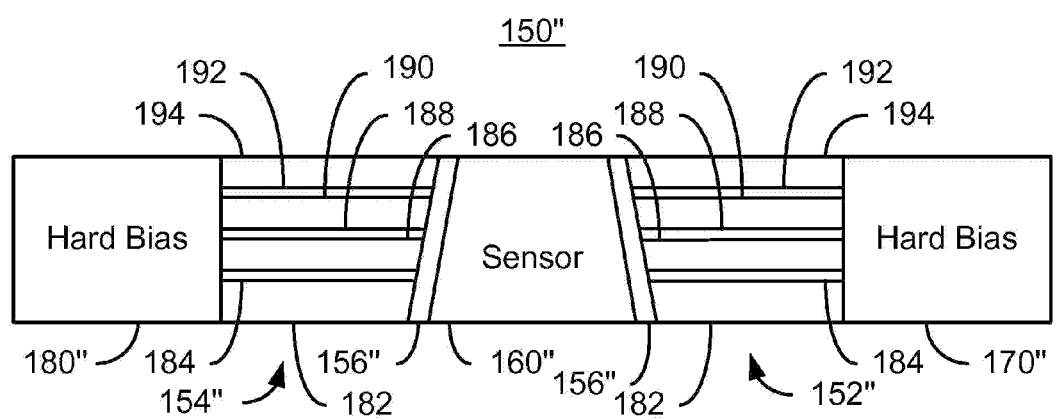
FIG. 8A is an ABS view of another exemplary embodiment of a portion of a magnetic recording read transducer.

FIG. 8A depicts an ABS view of another embodiment of a magnetic transducer 150". For clarity, FIG. 8A is not to scale and some components are omitted. The read transducer 150" may be part of a read head or may be part of a merged head that also includes a write transducer. The head of which the read transducer 150" is a part is part of a disk drive having a media, a slider and the head coupled with the slider. The magnetic read transducer 150" may be viewed as an application of the magnetic transducer 100, 100', 100", 100'", 150, or 150'. Similar components have analogous labels. The magnetic transducer 150" includes sensor 160", insulator 156", soft magnetic bias structures 152" and 154", and hard bias structures 170" and 180" that correspond to the sensor 160'/ 160/110/110'/110"/110'", insulator 156'/156/106, soft magnetic bias structures 152'/152/122/122'/122"/122'" and 154'/ 154/124/124'/124"/124'", and hard magnetic bias structures 170'/170/130/130'/130"/130'" and 180'/180/132/132'/132"/ 132'", respectively. Thus, the components 160", 156", 152", 154", 170", and 180" have a similar structure and function to the components 160'/160/110/110'/110"/110'", 156'/156/106, 152'/152/122/122'/122"/122'", 154'/154/124/124'/124"/ 124'", 170'/170/130/130'/130"/130'", and 180'/180/132/132'/ 132"/132'", respectively. Although not shown, in some embodiments, a nonmagnetic layer may reside between the soft magnetic bias structures 152" and 154" and the hard bias structures 170" and 180", respectively.

In the embodiment shown in FIG. 8A, the soft magnetic bias structures 152" and 154" include multiple layers. More specifically, the soft magnetic bias structures 152" and 154" each include layers 182, 184, 186, 188, 190, 192, and 194. The thickness of the layers 182, 184, 186, 188, 190, 192, and 194 is not to scale. In some embodiments, all of the layers 182, 184, 186, 188, 190, 192, and 194 are ferromagnetic. In other embodiments only some of the layers 182, 184, 186, 188, 190, 192, and 194 are ferromagnetic. For example, layers 182, 186, 190, and 194 are ferromagnetic while layers 184, 188, and 192 are nonmagnetic. In some embodiments, the ferromagnetic layers 182, 186, 190, and 194 are ferromagnetically aligned while in other embodiments, the ferromagnetic layers 182, 186, 190, and 194 are antiferromagnetically aligned. For example, the direction of magnetization may alternate between layers 182, 186, 190, and 194. In other embodiments, other arrangements of the layers 182, 184, 186, 188, 190, 192, and 194 are possible. Further, another number of layers may be used. Multiple layers 182, 184, 186, 188, 190, 192, and 194 of the soft magnetic bias structures 152" and 154" may allow for the properties of the soft magnetic bias structures 152" and 154" to be tailored. Although not shown, the hard bias structures 170" and/or 180" may also be multilayers.

The transducer 150" may share the benefits of the transducers 150', 150, 100, 100', 100", and/or 100'". The sensor 160" may be magnetically biased and enjoy the benefits of side shields such as reduced interference from adjacent tracks. The hard bias structures 170" and 180" may improve the magnetic uniformity of and reduce the chance of reversal for the soft bias structures 152" and 154". Thus, the reliability and performance of the transducer 150" may be improved. The magnetization direction of the hard bias structures 170" and 180" may be set by applying a magnetic field and without additional annealing. Thus, damage to the sensor 160" may be avoided. The hard bias structures 170" and/or 180" may also optionally be used to bias the shield(s) (not shown). Thus, performance of the transducer 150" may be further improved. Fabrication of hard bias structures 170" and 180" may also be relatively simple. Thus, the benefits of the hard bias structures 170" and 180" may be attained without significantly complicating processing.

Figure 8B:
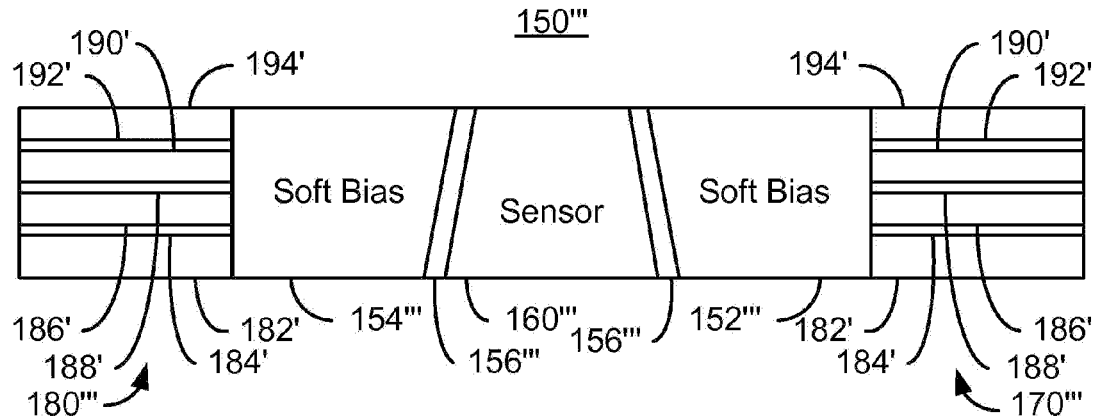
FIG. 8B is an ABS view of another exemplary embodiment of a portion of a magnetic recording read transducer.

FIG. 8B depicts an ABS view of another embodiment of a magnetic transducer 150"". For clarity, FIG. 8B is not to scale and some components are omitted. The read transducer 150'" may be part of a read head or may be part of a merged head that also includes a write transducer. The head of which the read transducer 150'" is a part is part of a disk drive having a media, a slider and the head coupled with the slider. The magnetic read transducer 150'" may be viewed as an application of the magnetic transducer 100, 100', 100", 100'", 150, 150', or 150". Similar components have analogous labels. The magnetic transducer 150'" includes sensor 160'", insulator 156'", soft magnetic bias structures 152'" and 154'", and hard bias structures 170'" and 180'" that correspond to the sensor 160"/160'/160/110/110'/110"/110'", insulator 156"/156'/156/ 106, soft magnetic bias structures 152"/152'/152/122/122'/ 122"/122'" and 154"/154'/154/124/124'/124"/124'", and hard magnetic bias structures 170"/170'/170/130/130'/130"/130'" and 180"/180'/180/132/132'/132"/132'", respectively. Thus, the components 160'", 156'", 152'", 154'", 170'", and 180'" have a similar structure and function to the components 160"/ 160'/160/110/110'/110"/110'", 156"/156'/156/106, 152"/ 152'/152/122/122'/122"/122'", 154"/154'/154/124/124'/124"/ 124'", 170"/170'/170/130/130'/130"/130'", and 180"/180'/ 180/132/132'/132"/132'", respectively. Although not shown, in some embodiments, a nonmagnetic layer may reside between the soft magnetic bias structures 152'" and 154'" and the hard bias structures 170'" and 180'", respectively.

In the embodiment shown in FIG. 8B, the hard bias structures 170'" and 180'" include multiple layers. More specifically, the hard bias structures 170'" and 180'" each include layers 182', 184', 186', 188', 190', 192', and 194'. The thickness of the layers 182', 184', 186', 188', 190', 192', and 194' is not to scale. In some embodiments, all of the layers 182', 184', 186', 188', 190', 192', and 194' are ferromagnetic. In other embodiments only some of the layers 182', 184', 186', 188', 190', 192', and 194' are ferromagnetic. For example, layers 182', 186', 190', and 194' are ferromagnetic while layers 184', 188', and 192' are nonmagnetic. In other embodiments, other arrangements of the layers 182', 184', 186', 188', 190', 192', and 194' are possible. Further, another number of layers may be used. Multiple layers 182', 184', 186', 188', 190', 192', and 194' of the hard bias structures 170'" and 180'" may allow for the properties of the hard bias structures 170'" and 180'" to be tailored.

The transducer 150'" may share the benefits of the transducers 150", 150', 150, 100, 100', 100", and/or 100'". The sensor 160'" may be magnetically biased and enjoy the benefits of side shields such as reduced interference from adjacent tracks. The hard bias structures 170'" and 180'" may improve the magnetic uniformity of and reduce the chance of reversal for the soft bias structures 152'" and 154'". Thus, the reliability and performance of the transducer 150'" may be improved. The magnetization direction of the hard bias structures 170'" and 180'" may be set by applying a magnetic field and without additional annealing. Thus, damage to the sensor 160'" may be avoided. The hard bias structures 170'" and/or 180'" may also optionally be used to bias the shield(s) (not shown). Thus, performance of the transducer 150'" may be further improved. Fabrication of hard bias structures 170'" and 180'" may also be relatively simple. Thus, the benefits of the hard bias structures 170" and 180'" may be attained without significantly complicating processing.

Figure 9:
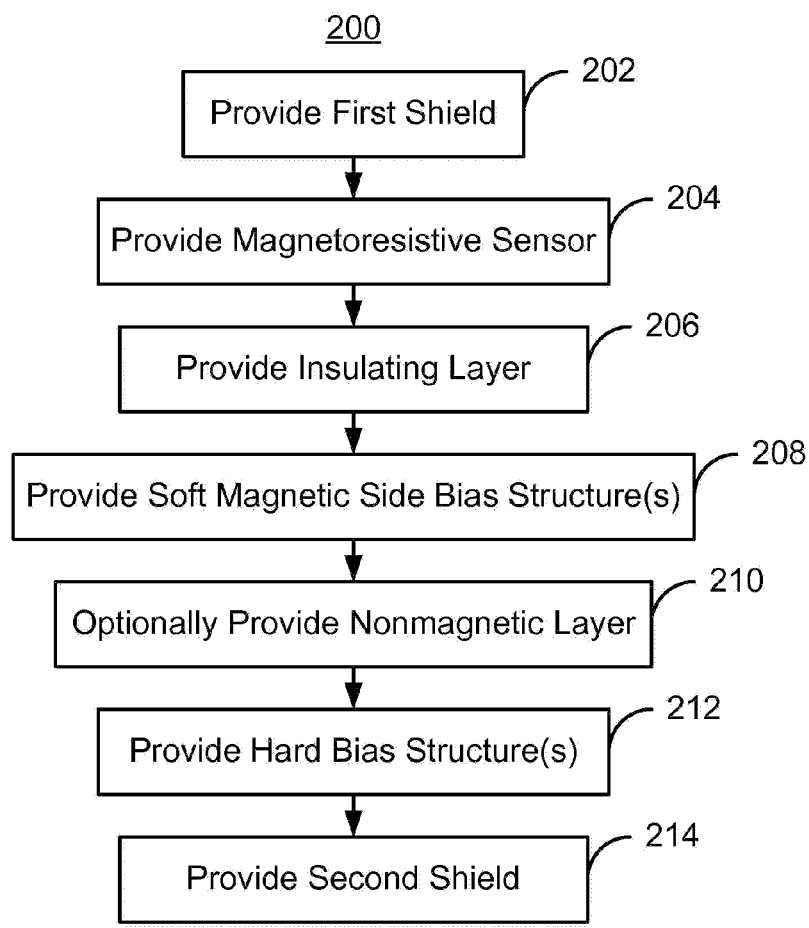
FIG. 9 is flow chart depicting an exemplary embodiment of a method for fabricating a portion of a magnetic recording read transducer.

FIG. 9 is an exemplary embodiment of a method 200 for providing a read transducer utilizing soft magnetic bias structures in combination with hard magnetic bias structures. For simplicity, some steps may be omitted, interleaved, and/or combined. The method 200 is also described in the context of providing a single recording transducer 100. However, the method 200 may be used to fabricate multiple transducers at substantially the same time. The method 200 may also be used to fabricate other transducers including but not limited to any combination of 100', 100'', 100''', 150, 150', and/or 150''. The method 200 is also described in the context of particular layers. A particular layer may include multiple materials and/or multiple sub-layers. The method 200 also may start after formation of other portions of the magnetic recording transducer.

The first shield 102 is provided, via step 202. Step 202 typically includes depositing a large high permeability layer. The sensor 110 is provided, via step 204. Step 204 typically includes depositing the layers for the sensor 110, then defining the sensor 110 in at least the track width direction using an ion mill. In some embodiments, the sensor 110 is also defined in the stripe height direction. In some embodiments, the layers for the sensor are not completely milled through to provide an extended pinned layer. The insulator 106 may then be provided, via step 206.

The soft magnetic bias structures 122 and 124 are provided, via step 208. Step 208 may include depositing the high permeability and any other material(s) for the soft magnetic bias structures 122 and 124 and defining the soft magnetic bias structures 122 and 124 in the track width and stripe height direction. Step 208 may also include depositing multiple layers for the soft magnetic bias structures 122 and/or 124. Further, in some embodiments, the soft magnetic bias structures 122 and 124 are provided such that they may be magnetically coupled to the shield 102 and/or 104. A nonmagnetic layer, such as the layer 162 and/or 164 may optionally be provided via step 210. However, in other embodiments, step 210 may be omitted.

The hard bias structures 130 and 132 are provided, via step 212. In some embodiments, step 212 is performed after step 208. Thus, the hard bias structures 130 and 132 are provided after the soft magnetic bias structures 22 and 124. Thus, the soft magnetic bias structures 122 and 124 would be defined in at least the track width direction prior to deposition of the hard bias structures 130 and 132. Any excess material for the hard bias structures 130 and 132 may then be removed. In other embodiments, the hard bias structures 130 and 132 might be provided first. Portions of the hard bias structures 130 and 132 closer to the sensor 110 may then be removed and the soft magnetic bias structures 122 and 124 deposited.

The shield 104 may then be deposited, via step 214. In some embodiments, the shield 104 may be magnetically coupled to the soft magnetic bias structures 122 and 124 and/or the hard bias structures 130 and/or 132. Formation of the transducer 100 may then be completed.

Using the method 200, the transducers 100, 100', 100'', 150, 150', and/or 150'' may be fabricated. Thus, the benefits of one or more of the transducers 100, 100', 100'', 150, 150', and/or 150'' may be achieved.

We claim:

1. A magnetic read transducer having an air-bearing surface (ABS) and comprising:
   a first shield;
   a read sensor including a sensor layer, the sensor layer having at least one edge in the track width direction along the ABS;
   at least one soft magnetic bias structure adjacent to the at least one edge, the at least one soft magnetic bias structure having a first permeability;
   at least one hard bias structure adjacent to a portion of the at least one soft bias structure and having a second permeability, the at least one soft bias structure being between the read sensor and the at least one hard bias structure, the first permeability is at least ten multiplied by the second permeability; and
   a nonmagnetic layer residing between the at least one hard bias structure and the at least one soft magnetic bias structure;
   a second shield, the read sensor residing between the first shield and the second shield, the at least one soft magnetic bias structure being physically connected with the second shield.

2. The magnetic read transducer of claim 1 wherein the at least one soft magnetic bias structure includes a plurality of layers.

3. The magnetic read transducer of claim 2 wherein the plurality of layers includes a plurality of ferromagnetic layers.

4. The magnetic read transducer of claim 3 wherein the plurality of ferromagnetic layers are antiferromagnetically aligned.

5. The magnetic read transducer of claim 3 wherein a first portion of the plurality of layers are ferromagnetically aligned and a second portion of the plurality of layers are antiferromagnetically aligned.

6. The magnetic read transducer of claim 1 wherein the read sensor has a stripe height perpendicular to the ABS and wherein the at least one soft bias structure and the at least one hard bias structure have a height substantially equal to the stripe height.

7. The magnetic read transducer of claim 1 wherein at least a portion of the read sensor has a stripe height perpendicular to the ABS and wherein the at least one soft bias structure and the at least one hard bias structure have a height less than the stripe height.

8. The magnetic read transducer of claim 1 wherein the read sensor has a stripe height perpendicular to the ABS and wherein the at least one soft bias structure and the at least one hard bias structure have a height greater than the stripe height.

9. A magnetic read transducer having an air-bearing surface (ABS) and comprising:
   a first shield;
   a read sensor including a sensor layer, the sensor layer having at least one edge in the track width direction along the ABS;
   at least one soft magnetic bias structure adjacent to the at least one edge, the at least one soft magnetic bias structure having a first permeability, the at least one soft magnetic bias structure includes a plurality of ferromagnetic layers;
   at least one hard bias structure adjacent to a portion of the at least one soft bias structure and having a second permeability, the at least one soft bias structure being between the read sensor and the at least one hard bias structure, the first permeability is at least ten multiplied by the second permeability;
   a nonmagnetic layer residing between the at least one hard bias structure and the at least one soft magnetic bias structure; and
   a second shield, the read sensor residing between the first shield and the second shield, the at least one soft magnetic bias structure being physically connected with the second shield;
   wherein adjacent ferromagnetic layers of the plurality of ferromagnetic layers are ferromagnetically aligned.

10. A method for providing a magnetic read transducer having an air-bearing surface (ABS) comprising:
    providing a first shield;
    providing a read sensor including a sensor layer, the sensor layer having at least one edge in the track width direction along the ABS;

providing at least one soft magnetic bias structure adjacent to the at least one edge, the at least one soft magnetic bias structure having a first permeability;

providing at least one hard bias structure adjacent to a portion of the at least one soft bias structure and having a second permeability, the at least one soft bias structure being between the read sensor and the at least one hard bias structure, the first permeability being at least ten multiplied by the second permeability;

providing a nonmagnetic layer residing between the at least one hard bias structure and the at least one soft magnetic bias structure; and providing a second shield, the read sensor residing between the first shield and the second shield, the at least one soft magnetic bias structure being physically connected with the second shield.

11. The method of claim 10 wherein step of providing the at least one soft magnetic bias structure further includes:

depositing a plurality of layers.

12. The method of claim 11 wherein the plurality of layers includes a plurality of ferromagnetic layers.

13. The method of claim 12 wherein the plurality of ferromagnetic layers are antiferromagnetically aligned.

14. The method of claim 12 wherein a first portion of the plurality of layers are ferromagnetically aligned and a second portion of the plurality of layers are antiferromagnetically aligned.

15. The method of claim 10 wherein the read sensor has a stripe height perpendicular to the ABS and wherein the at least one soft bias structure and the at least one hard bias structure have a height substantially equal to the stripe height.

16. The method of claim 10 wherein at least a portion of the read sensor has a stripe height perpendicular to the ABS and wherein the at least one soft bias structure and the at least one hard bias structure have a height less than the stripe height.

17. The method of claim 10 wherein the read sensor has a stripe height perpendicular to the ABS and wherein the at least one soft bias structure and the at least one hard bias structure have a height greater than the stripe height.

18. The method of claim 10 wherein the step of providing the at least one soft bias structure is performed before the step of providing the at least one hard bias structure.

19. The method of claim 10 wherein the step of providing the at least one hard bias structure is performed before the step of providing the at least one soft bias structure.

20. A method for providing a magnetic read transducer having an air-bearing surface (ABS) comprising:

providing a first shield;

providing a read sensor including a sensor layer, the sensor layer having at least one edge in the track width direction along the ABS;

providing at least one soft magnetic bias structure adjacent to the at least one edge, the at least one soft magnetic bias structure having a first permeability, the at least one soft magnetic bias structure includes a plurality of ferromagnetic layers;

providing at least one hard bias structure adjacent to a portion of the at least one soft bias structure and having a second permeability, the at least one soft bias structure being between the read sensor and the at least one hard bias structure, the first permeability being at least ten multiplied by the second permeability;

providing a nonmagnetic layer residing between the at least one hard bias structure and the at least one soft magnetic bias structure; and providing a second shield, the read sensor residing between the first shield and the second shield, the at least one soft magnetic bias structure being physically connected with the second shield, wherein adjacent ferromagnetic layers of the plurality of ferromagnetic layers are ferromagnetically aligned.

* * * * *